United States Patent [19]

Feigenbaum et al.

[11] Patent Number: 4,644,470
[45] Date of Patent: Feb. 17, 1987

[54] NON-UNIQUE NAMES FOR BROADCAST MESSAGES

[75] Inventors: Barry A. Feigenbaum, Deerfield Beach; Robert Sachsenmaier; James W. Skowbo, both of Boca Raton, all of Fla.

[73] Assignee: International Business Machines Corp., Armonk, N.Y.

[21] Appl. No.: 631,566

[22] Filed: Jul. 20, 1984

[51] Int. Cl.⁴ ............................................... G06F 1/00
[52] U.S. Cl. ..................................................... 364/200
[58] Field of Search ... 364/200 MS File, 900 MS File

[56] References Cited

U.S. PATENT DOCUMENTS 4,363,093  12/1982  Davis et al. ......................... 364/200

*Primary Examiner*—Raulfe B. Zache
*Attorney, Agent, or Firm*—Robert Lieber

[57] ABSTRACT

In a communication system wherein stored data file record entities are designatable by common names unrelated to their storage locations in the system, names are adopted selectively as unique or non-unique. As a check on uniqueness, requests to entities bearing unique names require a response by each system station at which entities so named are stored. More than one response is treated as a system error. By present conventions, requests to entities with non-unique names do not require responses. Applications made possible by non-unique names of this type are described in the present disclosure.

5 Claims, 9 Drawing Figures

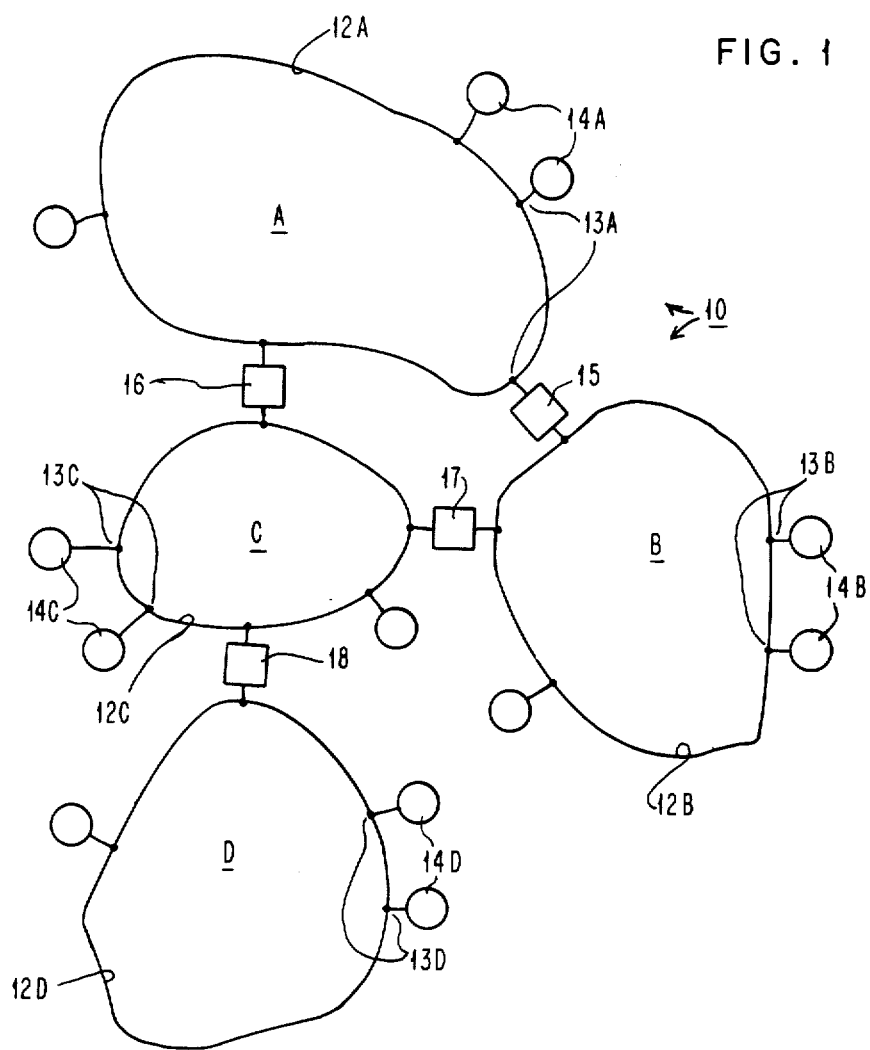

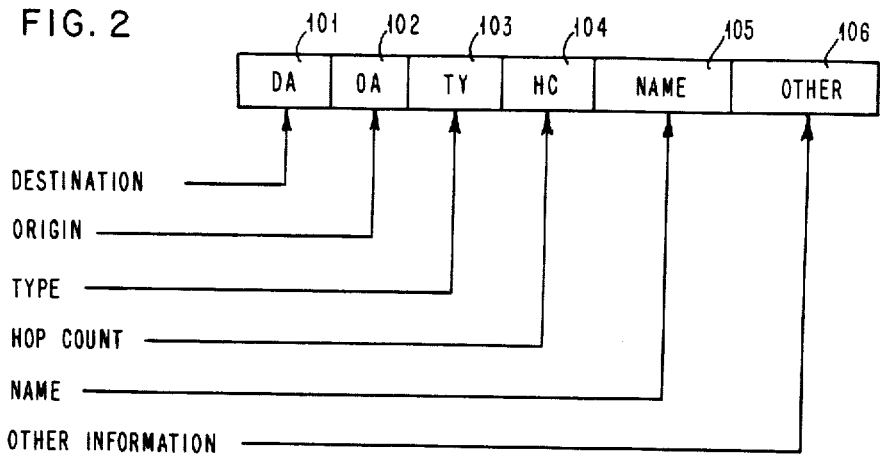

FIG. 2

- DESTINATION → 101 DA
- ORIGIN → 102 OA
- TYPE → 103 TY
- HOP COUNT → 104 HC
- NAME → 105 NAME
- OTHER INFORMATION → 106 OTHER

FIG. 3

| TYPE NO. | TYPE NAME | DEST. | FUNCTION |
|---|---|---|---|
| N1 | NAME CHECK | BROADCAST | CHECK NAME UNIQUENESS |
| N2 | CALL NAME CHECK | BROADCAST | CHECK EXISTENCE OF ENTITY IDENTIFIED BY NAME |
| N3 N4 ⋮ | DATAGRAM | BROADCAST | DIRECT INFORMATION TO GROUP OF ENTITIES BY NON-UNIQUE NAME |

FIG. 4   NAME TABLE (NODE 1)

| *STATUS | NAME | ASSOCIATED ENTITY |
|---|---|---|
| 1 BYTE PER ENTRY | ←——— 16 BYTES PER ENTRY ———→ | 16 ENTRY SPACES |

\* INCLUDES AT LEAST ONE BIT FOR DISTINGUISHING BETWEEN UNIQUE AND NON-UNIQUE

NON-UNIQUE NAMES FOR BROADCAST MESSAGES

CROSS-REFERENCE TO RELATED PATENT APPLICATIONS

Disclosures in the following co-pending patent applications are incorporated herein by the present reference:

A. U.S. patent application Ser. No. 604,684 filed May 3, 1984, by B. Feigenbaum et al, entitled "Distributed Control of Alias Name Usage in Networks", discloses a method for enabling processing stations which are linked for intercommunications with each other through access nodes of a local area data communication network to operate without reliance on any central station or global directory to adopt names for respectively served entities, and to establish communication sessions (i.e., logical connections) between respective entities and remotely served entities using such logical names.

B. U.S. patent application Ser. No. 631,567, filed July 20, 1984 by W. A. Doster et al, entitled "Name Usage Support Through Distributed Processing Networks Linked By Bridges And/Or Gateways", describes a method for efficiently extending the name checking and session call communications of the Feigenbaum et al application between processing facilities linked to different communication media or to (time or frequency) separated channels on one medium. This reference disclosed one particular application of non-unique names formed in accordance with the pesent invention; specifically, the use of a non-unique name to extend name checking and session establishment communications across bridging interfaces beween discrete media and/or channels, while restricting the hop count range of each such communication so as to prevent redundant circulation thereof through looping paths formed by a series of such interfaces.

BACKGROUND OF THE INVENTION

Communication systems of the kind described in the above-referenced application by Feigenbaum et al, permit processors attached to a local area network to act individually to adopt logical names for respective locally attached entities, and to initiate data communication sessions relative to remote entities by logical names. The name adoption and session calling process described in this reference require the initiating processor to broadcast a name checking communication over the network, and require the processors receiving such a communication to check the name against respective tables of locally adopted names. A processor performing this check, and finding a matching name entry in its table, returns an acknowledging communication to the originating processor. If the originating processor is performing a name adoption process, the acknowledgement causes it to reject the checked name and discontinue the adoption process.

Although this procedure for name adoption is quite adequate for many communication purposes, we recognize that it is useful in other circumstances to permit such communicating processors to adopt names already associated with other entities; specifically, this would permit distribution of information, in one signalling transaction on the network, to a group of plural entities sharing a common name. Such transactions, herein termed "multicasting", differ from conventional "broadcasting" techniques used in contemporary data communication networks. The latter networks traditionally employ a protocol for reception of signals sent in an ordinary broadcast form, which requires processing of the signal intelligence at all access nodes of the network, whereas "multi-cast" communications of the form presently contemplated would permit nodes to selectively process the signal intelligence if the accompanying non-unique or group name matches a local name table entry.

The present invention seeks to provide a method for enabling processors in the foregoing local area network environment to adopt names on either a unique or non-unique basis, which would in effect be transparent to the name adoption process described in the Feigenbaum et al reference, and thereby minimize the signalling traffic and processing loads added to the network for achieving such adoption.

SUMMARY OF THE INVENTION

The present invention provides a method for allowing data processing systems attached to nodes of a local area data communication network to direct communications in a multicast form to selectively established groups of entities. The basis for such communications is established by the presently defined method of allowing such systems to adopt logical names for respectively served entities on a non-unique basis.

The invention makes use of the name adoption method disclosed in the Feigenbaum et al reference, and allows for the adoption of non-unique names to appear transparent to the adopting procedures. In the Feigenbaum et al reference, a processor seeking to assign a name to an associated entity broadcasts a Name Check signal containing the proposed name, and other processors on the network compare the name in that signal with names previously adopted by them. On finding a match, the processor performing the comparison sends an acknowledging signal to the processor seeking to adopt the name, causing the latter to reject the name and abandon the adoption. In accordance with the present invention, a processor which has adopted a name may tag the name as either unique or non-unique, and then selectively condition its response to subsequent Name Checks containing that name as a function of the tagged condition. If the name is tagged as unique, the Name Check is acknowledged as in the Feigenbaum reference; but if the name is tagged non-unique, the Name Check is ignored (which operates to permit the processor originating the Name Check to also adopt the name).

Other aspects of the present invention pertain to the form of multi-cast communications presently used with non-unique names, and to specific applications of such communications.

These and other aspects, features, advantages and benefits of the present invention will be more fully understood and appreciated by considering the following detailed description and claims.

DESCRIPTION OF THE DRAWINGS

FIG. 1 schematically illustrates a representative local area network environment in which the present invention may be advantageously used;

FIG. 2 illustrates the form of Name Check communications used in the representative environment for controlling adoption of names;

FIG. 3 illustrates a number of presently relevant types of signals used in the representative environment;

FIG. 4 illustrates the form of a Name Table list maintained at each processing node of the representative network, and particularly shows how unique and non-unique names are distinguishable as such;

DETAILED DESCRIPTION OF PREFERRED EMBODIMENT

1. Introduction/Environment

Figure 5:
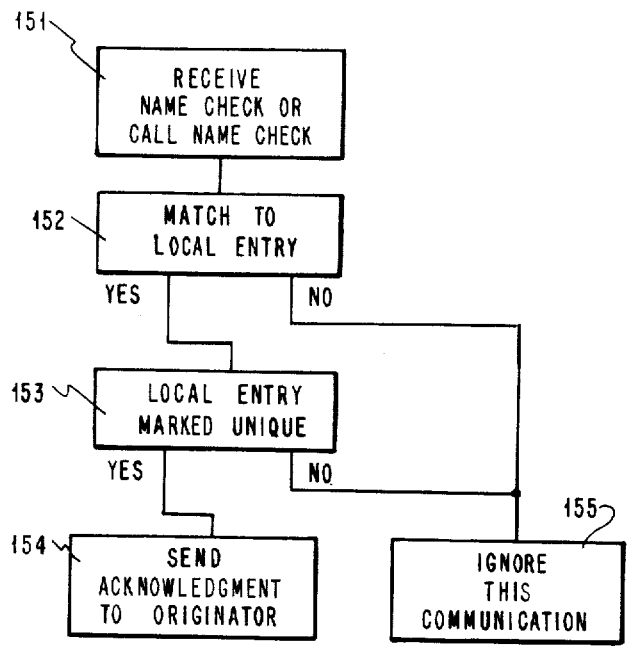
FIG. 5 is a flow diagram illustrating he handling of Name Check messages at nodes receiving such messages, and detailing the presently distinctive feature of permitting the receiving node to ignore the communication, despite having a prior adoption of the name being checked if the prior adoption has been tagged as non-unique.

Referring to FIG. 1, primitive networks A-D (the term "primitive", as presently used, refers to a network linked by a single medium or even a single channel on one medium) contain respective media/channels 12A, 12B, 12C, 12D having respective nodes or taps 13A, 13B, 13C, 13D, these notes serving respective communication and data processing facilities 14A, 14B, 14C, 14D. Bridging facilities, shown at 15-18, link media 12A-12D to form a complex network configuration (i.e., a network containing plural primitive sub-networks. The bridging facilities may couple to respective media through nodes either physically separate from the nodes 13A-13D or they may reside physically within any of the facilities 14A-14D and share respective nodes. Each primitive network may serve multiple processing facilities or stations 14 through nodes 13 of the respective medium/channel.

Bridging facilities, of the type represented at 15-18, are presently well known in the art. Such facilities are described, for example, in U.S. Pat. Nos. 4,287,592 (granted Sept. 1, 1981, to Paulish et al) and 4,365,331 (granted Dec. 21, 1982, to Biba et al). The operation of these facilities in respect to a "bridging" application of the subject non-unique name feature is descibed in the above-referenced "Name Usage Support" application. The facilities may include programmed microprocessors and storage units permitting them to perform sophisticated buffering and format translation operations on information signals in transit between linked media/-channels. In the configuration exemplified in FIG. 1, bridge facility 15 links media/channels 12A and 12B, bridge 16 links media/channels 12A and 12C, bridge 17 links media/channels 12B and 12C, and bridge 18 links media/channels 12C and 12D.

The foregoing processing facilities(14A-14D) operate through respective network nodes (13A-13D), in the manner described in the cross-referenced co-pending patent applications, to adopt logical (alias) names for respective entities (operators, programs, data sets, etc., served at the respective node sites). These names are characterized as logical because they need have no direct associations wih physical locations of respective entities. The adoption procedure is characterized by communications over the network which do not require any intermediate handling to translate logical names into addess parameters repesenting specific nodes or sites in the network.

In these communications, the station seeking to adopt a name or originate a session sends the object name (the name proposed for adoption or the name representing the entity to e linked in a session) out over the network in a broadcast "name checking" request message. Stations receiving the request compare the name to names currently adopted at respective stations, and return a reply message to the request originator if a match is detected. Such comparisons are made relative to entires in Name Tables maintained at the station facilities 14A-14D.

At the request origin, a reply to a request relating to name adoption is treated as indicating conflicting usage and the name is rejected. At the request origin receiving a reply to a name checking request associated with session establishment, the reply indicates existence of an entity known by the called name, and the session establishment process is continued with other communications not presently relevant.

2. The Problem

The problem addressed by the present invention relates to the foregoing practice of requiring stations receiving a name checking request communication and detecting local adoption of the object name specified in the request, to return a reply/acknowledgement communication. It is recognized presently that, for certain applications, it is desirable to allow for multiple adoption of a single name to represent a group of entities, and theeby allow network users to transfer information to all members of the group in a "multicasting" operation. Multicasting is like broadcasting which is conventionally used in contemporary networks, but differs in that it allows the receiving stations to selectively process or ignore the communicated information, depending on their current name adoption states, and furthermore allows steering of the communicated information directly to entities associated with the group name (e.g., to a specific storage file such as "accounts receivable" or "budget").

The present invention concerns a method for providing selective group sharing of logical names, in the foregoing representative environment. and applications thereof for multicast transfer of information in said network.

3. Information Formats

Formats of information signals relevant to understanding the present invention are indicated in FIGS. 2 and 3. Such signals contain address fields 101 and 102, respectively defining destination and origin nodes. The field 103 distinguishes the message type. Several presently relevant types of messages are shown in FIG. 3. Hop count field 104 contains a number which may be used to restrict the number of bridges though which the signal information is allowed to pass (see foregoing co-pending application references). Field 105 contains a logical name which determines the handling of the respective message at receiving nodes. Field 106 may contain other (not presently relevant) information.

Referring to FIG. 3, message types presently of interest include: name checking requests (Name Check and Call Name Check) and their not-shown acknowledgements (see the referenced "Distributed Control" application for more details of these messages and their handling), and datagrams. Name checking requests and datagrams are sent over the network in a broadcast form. Stations receiving a name checking message compare the communicated name 105 with names in a local name table (FIG. 4), and return an acknowledgement if a match is detected. Stations receiving a datagram also compare the communicated name with names in their Name Tables, and either transfer the accompanying information to internal storage for processing or ignore it, depending on whether or not a match is found. Datagrams are not acknowledged.

Name checking requests comprise Name Check and Call Name Check types. Name Check is used in connection with name adoption, and Call Name Check is used for session establishment. If a Name Check is acknowledged, the station originating the request rejects the acknowledged name. If a Call Name Check is acknowledged, the station originating that request initiates further communications pertaining to session establishment (see "Distributed Control" application reference).

4. Operation of The Invention

In accordance with the present invention, the Name Tables used for name comparison at receiving stations contain at least one status bit for distinguishing unique and non-unique states of respective name entries (see footnote, FIG. 4). The processing facility serving the respective station sets this status or tag bit when the name is adopted. The selection of the tagged state is transparent to the other network stations, but, as explained next, it affects the operation of the adopting station in response to subsequent name checking messages.

Referring to FIG. 5, a station receiving a name checking message (151, FIG. 5) compares the communicated name with entires in its Name Table as in the system described in the "Distributed Control" reference (152, FIG. 5). However, the transfer of acknowledging signals is conditioned on two factors. If a match is detected and the matching entry is marked unique (153, FIG. 5), an acknowledgement is returned to the request originator (154, FIG. 5). Conversely, if one of these conditions is not satisfied (match not found or matching entry found with non-unique mark), the request is ignored (155, FIG. 5).

Since a station does not acknowledge a Name Check request containing a name matching a respective Name Table entry marked non-unique, it should now be appreciated that this forms a basis for enabling plural stations to adopt a common name for a group of respectively served entities and thereby share access to these entities by the respective name. All that is required is that users of those stations agree in advance on the name they wish to associate with the group and to mark their respective Name Table entries as non-unique if they can successfully adopt the name. Assuming that the name has not been adopted elsewhere in the net work with unique marking status, each station's Name Check request relative to its adoption will go unacknowledged and the name will be adopted as non-unique at the requesting station.

5. Application of Non-Unique Tag

The adoption of names tagged as non-unique permits stations in the above system to multicast information to select groups of entities. In preparation for this, stations serving a group of entities must operate individually to adopt a common name for the group. Each station must send a Name Check request with that name, and adopt the name with a non-unique tag mark if no acknowledgements are received. A station adopting the name as non-unique will, of course, not acknowledge Name Check request sent by other stations (refer to discussion of FIG. 5 above).

Figure 6:
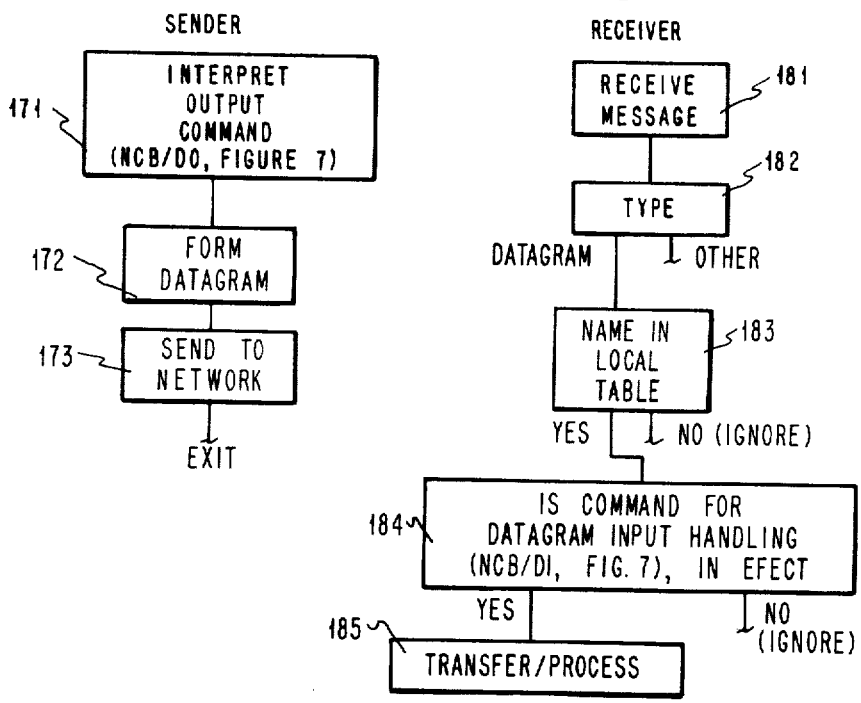
FIG. 6 schematically illustrates the process for transmission and reception of datagram form messages in accordance with the present invention.
Figure 7:
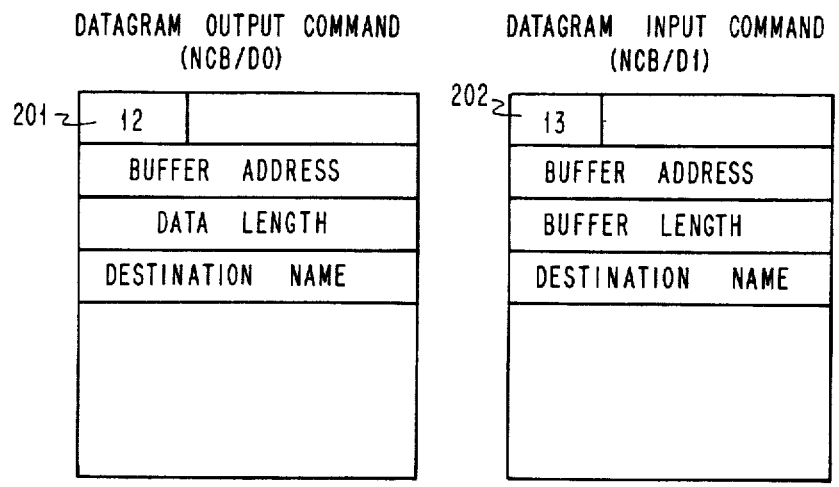
FIG. 7 schematically illustrates forms of output and input command descriptors respectively useful for permitting network processors to control generation and reception handling of datagram form messages.
Figure 8:
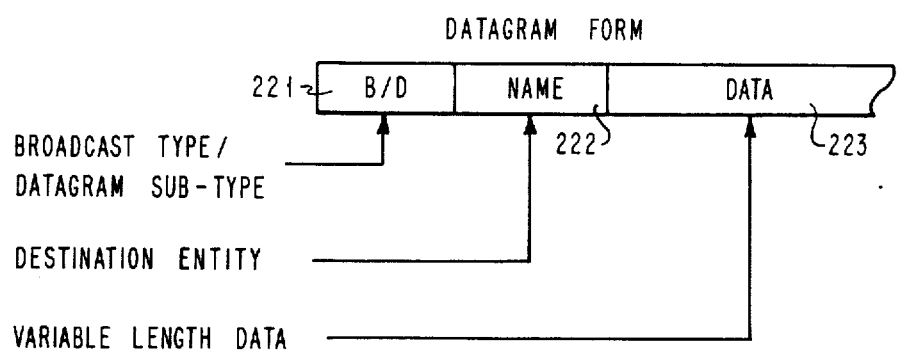
FIG. 8 illustrates the datagrams form referred to above.

When the name has been adopted for the group, information may be multicast from any station to all member entities of the group in datagram form. The form and handling of datagrams is indicated in FIGS. 6–8. FIG. 6 indicates how datagrams are treated at sending and receiving stations of the network; FIG. 7 indicates the form of command descriptors which may be used to originate and receptively process the data parts of datagrams; and FIG. 8 indicates the typical form of a datagram.

As shown in FIG. 6, to send a datagram the processing facility at a sending station interprets an output command (171, FIG. 6), which is contained in a respective Network Control Block Datagram Output descriptor ("NCB/DO", FIG. 7). This command identifies the location in the processor's memory of the data to be communicated. That data is fetched, appended to the control information forming the datagram (172, FIG. 6), and sent out over the network (173, FIG. 6). It is sent in a broadcast form, and therefore its control information at least will be examined at stations receiving the respective signals.

At each station receiving a datagram (181, FIG. 6) the type field (103, FIG. 3) is recognized as that of a datagram (182, FIG. 6), causing the station to perform the operations associated with reception handling of datagrams. The name communicated in the datagram is compared to the entires in the respective Name Table (183, FIG. 6), and if no match is found the communication is ignored. It a match is found, but the station is not currently prepared for datagram input processing ("No" condition at 184), the communication is not processed further (although a signal may be sent via the network to the datagram originator, informing the latter station of this condition). If both conditions are met (name match found and station prepared for datagram input processing ("yes" branch at 184), the datagram information is transferred to processor memory at the respective station and held there for further processing (185, FIG. 6). To be prepared for input handling of datagrams, a station must have previously executed an associated input command contained in a respective Nework Control Block Datatram Input descriptor (NCB/DI, FIG. 7).

The forms of the above-referenced output and input descriptors are shown in FIG. 7. Respective control fields 201 and 202, in these arrays, contain command operation codes designating the required functions. Each descriptor has a "buffer address" defining the location in the respective system's memory from or to which the related data transfer operation is to be conducted. The output command array contains a "data length" field indicating the number of bytes of data to be transferred, and the input array contains a "buffer length" field indicating the number of bytes which can be accepted. Each array contains a "destination name" which is the logical name of the intended receiving entity or group of entities. If the name is unique in the network, the respective datagram is effectively steered to a single entity. If the name has been adopted on a non-unique basis, the datagram may be passed to a group of plural entities.

As shown in FIG. 8, each datagram contains control information 221, designating its broadcast destination and datagram type, a destination name 222 defining its processing destination entity, and a variable length data field 223. A simple example illustrating the use of datagram type communications and session (point-to-point) communications is given in FIG. 9.

Figure 9:
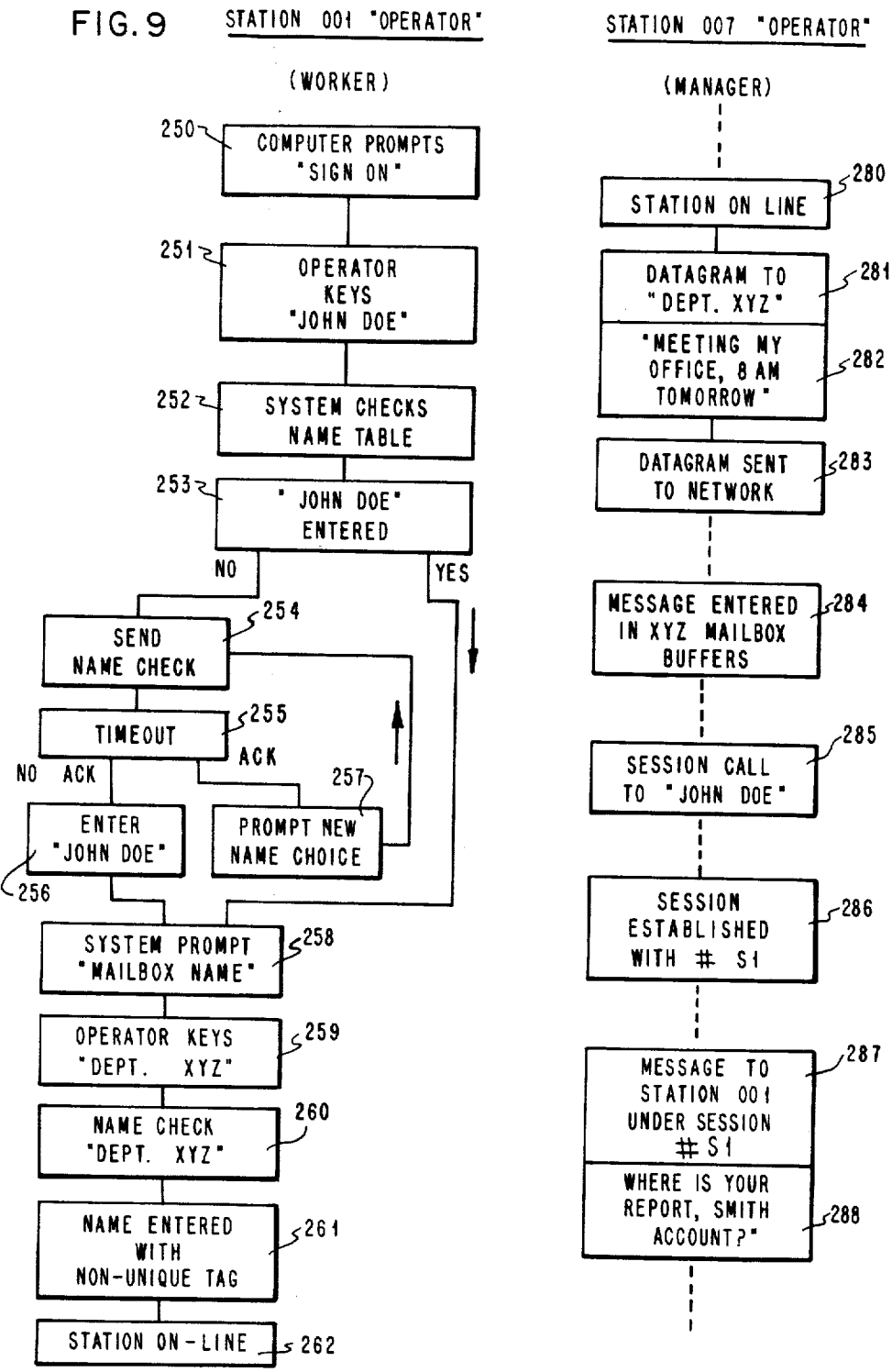
FIG. 9 illustrates a typical application of the subject non-unique name feature.

Referring to FIG. 9, assume that in a typical business office environment individual workers and supervisors have personal computer type workstations at their desks, and that these workstations interface to a communication medium for linking their associated operators for data communication. Station 001 in this figure represents a typical processor serving a worker in department "XYZ", station 007 represents a processor serving a manager of that department.

When the worker, "John Doe", at station 002 begins operating his computer, he receives a "sign on" prompt (250) in response to which he keys in his name (251). The computer system checks this name against its local Name Table (252) to determine the status of the operator's name. If the name does not match any entry ("no" branch at 253), the system performs an Add Name operation (see "Distributed Control" reference) to broadcast a Name Check request over the network for "John Doe" (254, FIG. 9). After sending the request, the system at station 001 times out for a predetermined interval (255, FIG. 9) waiting for acknowledgements of its request. If no acknowledgement is received, the name "John Doe" is entered in the local Name Table and marked as unique (256, FIG. 9). If one or more acknowledgements return, the name is rejected and the operator is prompted (257, FIG. 9) to select another name (e.g., "John Doe—1"), whereupon the name checking process 254, 255 is repeated.

After verifying prior adoption of the operator's name (step 253) or completing adoption of a suitable name (step 256), the system prompts the operator to select a "mailbox name" (258) which will later be used for receptive handling of datagrams relative to this operator. The operator keys "Dept. XYZ" (step 259), and the system conducts a Name Check communication relative to that name (step 260) with intention of adopting the name on a non-unique basis if no acknowldgements are received. If the department name has been correctly handled at other stations (i.e., tagged non-unique if and when adopted), there will be no acknowledgements, and the name will be adopted at station 001 (step 261). The station is then receptive to other communications, or "on-line" (stage 262). This procedure is repeated at other worker stations, each station adopting "Dept. XYZ" as non-unique and being able to do so because the related Name Checks will not be aknowledged (since stations have also marked their entries as non-unique).

Under Station 007 in FIG. 9, it is assumed that a similar process has taken place relative to the department manager, bringing his processor to an on-line state at the first illustrated position 280. If the manager now wants to notify all department workers of a meeting, he directs his system to prepare a datagram to "Dept. XYZ", as shown at 281, containing the desired message (282) in its data field. The procedure by which this operation is not considered pertinent to the present invention (it could, for instance, involve a series of prompts from the computer system to the manager offering selection menus for communication of messages, and for distinguishing such messages as addressed to a single entity or a group; with the system responding to a group choice to prepare the message data in memory and output the data into a datagram communication via suitable NCB/DO). The datagram message is then sent over the network (283) to all stations including 001. The effect, as represented at 284, is that the message will be entered into the mailbox buffers at all stations currently being operated by workers in the respective department.

Later, the manager may choose to direct a private communication to "John Doe" and interact with his computer for that purpose. Transparently to the manager, his station system will direct a session call (Call Name Check) to "John Doe" (285) and assuming that the manager has used the name currently adopted for the operator at station 001, the session will be established through a response from station 001 and other communications (286). In the other communications, the session will be assigned a session number "#S1" unique to that session (thus, the manager and John Doe could be conducting other private communications concurrently, under other session numbers). Operating under this session, station 007's computer sends the private message keyed in by the manager specifically to "John Doe" (see 287, 288); and note that John Doe's computer can only receive this message n a buffer prepared for John Doe, and only present that message to John Doe, even if John Doe and others are using the same workstation at differerent times).

Accordingly, while the invention has been described with reference to a particular embodiment, it will be understood by those skilled in the art that various modifications in form and detail may be made without departing from the spirit and scope of the invention.

Accordingly, we claim:

1. In a data communication system comprising plural data processing stations linked through communication media for exchanging formatted messages containing data signals, each station directly serving plural entities and containing a Name Table designating logical names currently adopted for representing respective entities, said names being adopted by broadcasting a Name Check request type message from the adopting station to all other stations, over the network formed by said media, and adopting the name if the request message is unacknowledged by said other stations, said stations using said names to share access to entities served by other stations and to establish communication links with such shared entities by respective names adopted at their serving stations (rather than by addresses having location context), a method for adapting said stations to be able to multicast information to various selected groups of said entities comprising:

providing a tagging space in each of said Name Tables for distinguishing each adopted name entry in the respective table as having either unique or non-unique status relative to the network formed by said media; and conditioning acknowledgement of any remotely originated Name Check request received at any one of said stations on the coincident existence of a name match, between a name communicated in said request and a name entry in the one station's Name Table, and an indication of unique status in the tagging space allotted to said name entry.

2. A method in accordance with claim 1, for adapting data communicating stations to communicate by multicasting information to groups of entities comprising:

sending a first Name Check request containing a first logical name from a first one of said stations to the other stations in said network, said first logical name being intended to designate a group of entities including a first entity served at said first station and other entities served at other stations;

adopting said first name at said first station, in response to receiving no acknowledgements of said request at said first station, by creating a respective Name Table entry at said first station defining an association between said first name and said first entity;

tagging said respective Name Table entry as non-unique, by operations internal to said first station; and repeating said sending, adopting and tagging operations at one or more other stations for associating said first name with other entities served at said other stations.

3. A method for adapting data communicating stations in accordance with claim 2 comprising:

broadcasting a message containing said first name and other information from any station in said network to all other stations in said network, said message having a predetermined first form requiring other stations to either receive and process the other information in said message or ignore the message, depending respectively on the existence or non-existence at each said other station of a name entry in its respective Name Table matching said first name.

4. In a data communication system for linking muliple data processing stations through media for conducting signal communications, each station directly serving plural entities and containing a Name Table for designating logical names currently adopted for representing respective entities relative to said signal communications, a method for adapting said system to support communications between said entities on either a unique or non-unique basis comprising:

marking individual name entires in said tables as either unique or non-unique at the option of processing equipment serving the respective entities;

broadcasting a name checking signal communication over said media from a first station proposing to adopt a name to other stations, with the objective of conditioning adoption of the name at said first station on non-acknowledgement of the respective checking signal by any other station; said checking signal containing a representation of said proposed name, at any station receiving said checking signal, returning an acknowledging signal to the station originating said checking signal if the Name Table at the receiving station contains a name matching the proposed name and the respective table entry is marked unique; and at any such receiving station, ignoring the respective checking communication if the respective table either does not contain a matching name entry or if the table contains a matching entry marked non-unique.

5. The method according to claim 4 comprising:

sending datagram signal communications over said media from any source station, each datagram containing a varied length data field and a name designating ne or more processing entities served at stations other than the source station;

at each station receiving said datagram signals, ignoring the information if either the respective Name Table does not contain a name entry matching the name in the datagram or the table contains a matching entry but the station is unprepared to receive the respective communication; and at any station receiving the datagram signals, and having both a matching name entry and a condition of preparation to serve signal communications to the entity associated with said entry, storing the data signals contained in said datagram in an area of the respective station's memory determined by said preparation; whereby said data signals are made available to be served to the associated entity.

* * * * *